United States Patent
Krauth et al.

(10) Patent No.: US 6,429,614 B1
(45) Date of Patent: Aug. 6, 2002

(54) METHOD AND DEVICE FOR CONTROLLING AN ELECTRONICALLY COMMUTATED POLYPHASE D.C. MOTOR

(75) Inventors: Wolfgang Krauth, Achern-Sasbachried; Wolfgang Schwenk, Oberkirch-Tiergarten, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/673,037

(22) PCT Filed: Mar. 23, 1999

(86) PCT No.: PCT/DE99/00838
§ 371 (c)(1),
(2), (4) Date: Jan. 4, 2001

(87) PCT Pub. No.: WO99/52201
PCT Pub. Date: Oct. 14, 1999

(30) Foreign Application Priority Data

Apr. 7, 1998 (DE) .......................................... 198 15 425

(51) Int. Cl.$^7$ .................................................. H02P 6/22
(52) U.S. Cl. ...................... 318/254; 318/439; 318/138; 318/145; 318/281; 318/273
(58) Field of Search .................................. 318/254, 145, 318/439, 281, 273, 138

(56) References Cited

U.S. PATENT DOCUMENTS

| | | | | |
|---|---|---|---|---|
| RE31,229 E | * | 5/1983 | King .......................... 318/696 |
| 4,857,814 A | * | 8/1989 | Duncan ....................... 318/281 |
| 5,221,881 A | * | 6/1993 | Cameron ..................... 318/254 |
| 5,306,988 A | * | 4/1994 | Carobolante et al. ........ 318/254 |
| 5,481,167 A | * | 1/1996 | Rohrbaugh et al. .......... 318/254 |
| 5,534,763 A | * | 7/1996 | Williams et al. ............. 318/799 |

FOREIGN PATENT DOCUMENTS

| | | |
|---|---|---|
| DE | 44 19 351 | 12/1995 |
| EP | 0 316 716 | 5/1989 |
| EP | 0 671 811 | 9/1995 |

* cited by examiner

Primary Examiner—Robert E. Nappi
Assistant Examiner—Rita Layken
(74) Attorney, Agent, or Firm—Kenyon & Kenyon

(57) ABSTRACT

A device and method for driving a polyphase DC motor, in which a phase selector circuit, in each case, selects only one phase, which is fed to a commutation detection circuit. After each commutation detected by a commutation detection circuit, as a result of a pulse of constant duration generated by a monoflop, the phase discriminator circuit and, as a consequence, the commutation logic are advanced in a fixed and preestablished sequence. This occurs irrespective of the rotation direction of the motor using the sequential logic device embodied by the commutation logic. When the motor rotates in the preferred direction, constant current-flow angles of 120° are achieved for each phase. When the motor rotates in the reverse direction, markedly varying current-flow angles of the individual phases are generated, and these varying current-flow angles, as a function of the course of the specifically corresponding voltages induced in the individual phases, result in a counter-torque. This counter-torque causes a braking of the motor to a standstill and a reliable startup in the preferred direction. The exemplary electronics, in this context, do not distinguish between the two rotation directions so that no additional electronics expense is required to reliably startup from a reverse rotation condition.

8 Claims, 3 Drawing Sheets

METHOD AND DEVICE FOR CONTROLLING AN ELECTRONICALLY COMMUTATED POLYPHASE D.C. MOTOR

FIELD OF THE INVENTION

The present invention relates to a method and a device for driving an electronically commutated, polyphase direct current (DC) motor, whose winding strands can be connected to a DC energy source in a preestablished sequence using switching elements that are driven by an electronic commutation device, steps being provided for braking the motor running in the reverse rotation direction and for restarting it in the preferred rotation direction.

BACKGROUND INFORMATION

A method of this type and a device of this type are available from German Published Patent Application No. 44 19 351.

Electronically commutated DC motors, especially polyphase synchronous motors maybe used in motor vehicles, due to their small structural design, for example, as heating and/or AC blower motors. In this context, it is believed to be disadvantageous that these motors in the switched-off state can rotate in the reverse rotation direction over the fan wheels mounted on the rotor shaft. A reverse rotation direction of the motor can be brought about, for example, by impact pressure and/or air currents in the vehicle. Because the rotor of the electronically commutated synchronous motor, due to the absence of brushes, is opposed by a slight friction, which is the result exclusively of air resistance and bearing friction, a motor of this type can rotate in the reverse rotation direction up to its maximum rotational speed. If a motor of this type, rotating in the reverse rotation direction, is switched on, for example, to set a blower in operation, it is believed to be very disadvantageous that the motor, depending on the position of the rotor, starts up (moving) either in the correct rotation direction or in opposition to the desired rotation direction.

The available device and method of German Published Patent Application No. 44 19 351 provide that the voltages induced in the winding strands of the stator during the reverse rotation of the rotor are compared with a threshold value, and, in accordance with the comparison, a defined flow of current to the winding strands is brought about. In the reverse rotation direction of the motor, this defined flow of current to the winding strands is designed to bring about the controlled, active braking of the rotor. In particular, after a reverse rotation is detected by comparing the voltages induced in one preselected winding strand and in the next strand but one with the threshold value, the preselected winding strand is connected to the operational voltage by switching on a power transistor connected to this winding strand. Accordingly, a magnetic field is generated that is directed in opposition to the magnetic field of the permanent magnets rotating in the rotor, such that the reverse rotation direction of the rotor is braked. In the available method discussed above, to achieve a reliable braking action, care is taken that, during the braking, the frequency of the phase voltage amounts to half of the voltage induced in the winding strands. For this reason, the electronics must distinguish between the two rotation directions, and additional expense for component parts is necessary to make possible a reliable startup from the reverse rotation direction.

SUMMARY OF THE INVENTION

An object of an exemplary embodiment and of an exemplary method according to the present invention is to provide a method and a device for driving an electronically commutated polyphase DC motor, especially a synchronous motor, such that a motor rotating in the reverse rotation direction due to external influences is braked from its reverse rotation direction at any switch-on time and subsequently starts up in its preferred rotation direction, without any additional component units being necessary for this function, to distinguish the rotation direction of the motor.

The above objective is believed to be achieved according to an exemplary method of the present invention the present invention that has the following steps:

a first step that, in each case, selects only one phase at each time point;

a second step that carries out a commutation detection, the voltage in the selected phase induced in the corresponding motor winding being compared with a reference voltage; and a third step that, after the commutation is detected, advances the selected phase and the phase to be commutated by the commutation device by one step in the preestablished sequence, so that, when the motor is rotating in the preferred direction, for each phase a constant current-flow angle is established, and, when the motor is rotating in the reverse direction, for each phase markedly varying current-flow angles are established, which, depending on the curve of the corresponding induced phase voltage, result in a counter-torque opposing the reverse rotation direction.

The objective is also believed to be achieved by an exemplary embodiment of a device of the present invention for driving an electronically commutated, polyphase DC motor, the device having a power switch connected to the motor, the power switch, in a preestablished sequence, supplying the individual winding strands of the motor with a pulsed DC voltage that is derived from a DC voltage source; a commutation logic driving the power switch part in accordance with the preestablished sequence; and an arrangement or structure that brakes the motor from a reverse rotation direction and sets it in motion again in the preferred rotation direction, the device having a phase selector circuit connected to the motor windings and acted upon by an output signal from a phase discriminator circuit connected to the commutation logic, and which at every time point, selects, in each case, only one phase, a commutation detection circuit, acted upon by the phase selected by the phase selector circuit, detects a commutation by comparing the voltage induced in the selected phase in the corresponding motor winding with a reference voltage, and generates a commutation detection signal, and the phase discriminator circuit, and therefore the commutation logic, is advanced one step in the preestablished sequence by the commutation detection circuit in response to each commutation detection signal, so that when the motor rotates in the preferred direction, for every phase a constant current-flow angle is established, and when it rotates in the reverse direction, for every phase markedly varying current-flow angles are established, which, depending on the course of the corresponding voltage induced in each phase, generate a counter-torque opposing the reverse rotation direction.

DETAILED DESCRIPTION

Figure 1:
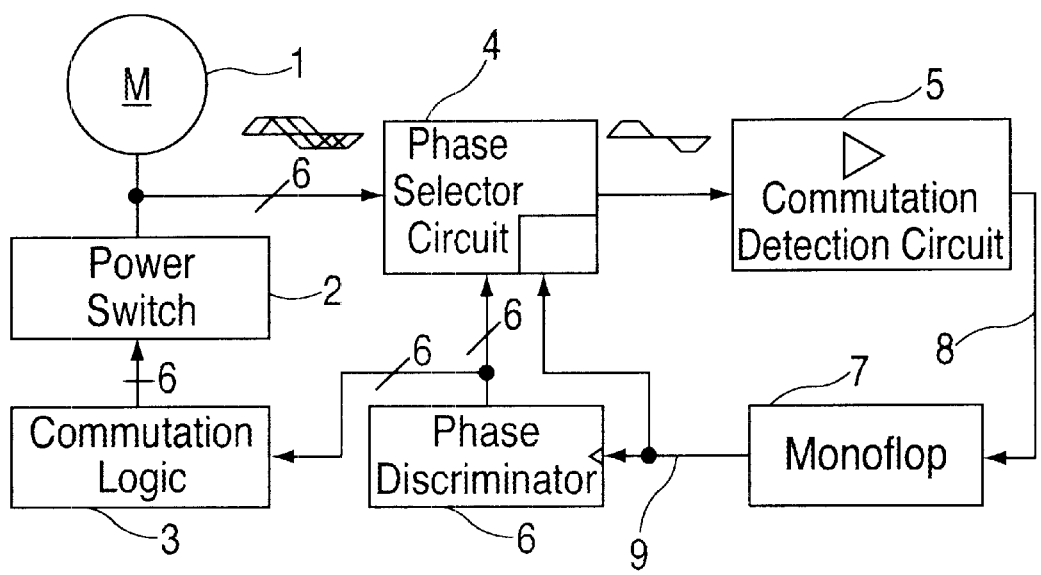
FIG. 1 shows a block diagram of an exemplary embodiment of a device according to the present invention for driving a 6-phase DC motor.

In FIG. 1, a synchronous motor 1 has a total of six phases, each of which is phase shifted at an electrical angle of 60°. The six winding strands of motor 1 are connected, on the one hand, to the power switches of a power switch part 2 and, on the other hand, to a phase selector circuit 4. Power switch part 2 is driven by the output signals of a commutation logic 3. At each time point, only one of the six phases is selected by phase selector 4 and is fed to a commutation detection circuit 5. The commutation detection circuit detects a commutation by comparing the voltage induced in the corresponding motor winding in the phase selected by phase selector circuit 4 with a reference voltage $U_{ref}$, and it thereupon generates a commutation detection signal 8. The commutation detection signal 8 triggers a monoflop 7, which generates an output pulse 9 of duration t_blank, the pulse being fed in inverted form to a release input of phase selector circuit 4, so that the latter for duration t_blank of output pulse 9 is blocked by monoflop 7 to avoid faulty commutations. At the same time, output pulse 9 from monoflop 7 advances a phase discriminator 6 one state further. The output signals of phase discriminator 6 act directly upon commutation logic 3 and also upon phase selector circuit 4.

The motor driver device depicted in FIG. 1 for driving electronically commutated 6-phase synchronous motor 1 has the effect that, when the motor rotates in the preferred direction, for every phase a constant current-flow angle is established, and, when motor 1 rotates in the reverse direction, for every phase markedly varying current-flow angles are established, which, depending on the course of the corresponding voltage induced in each phase, generate a counter-torque opposing the reverse direction.

Figure 2:
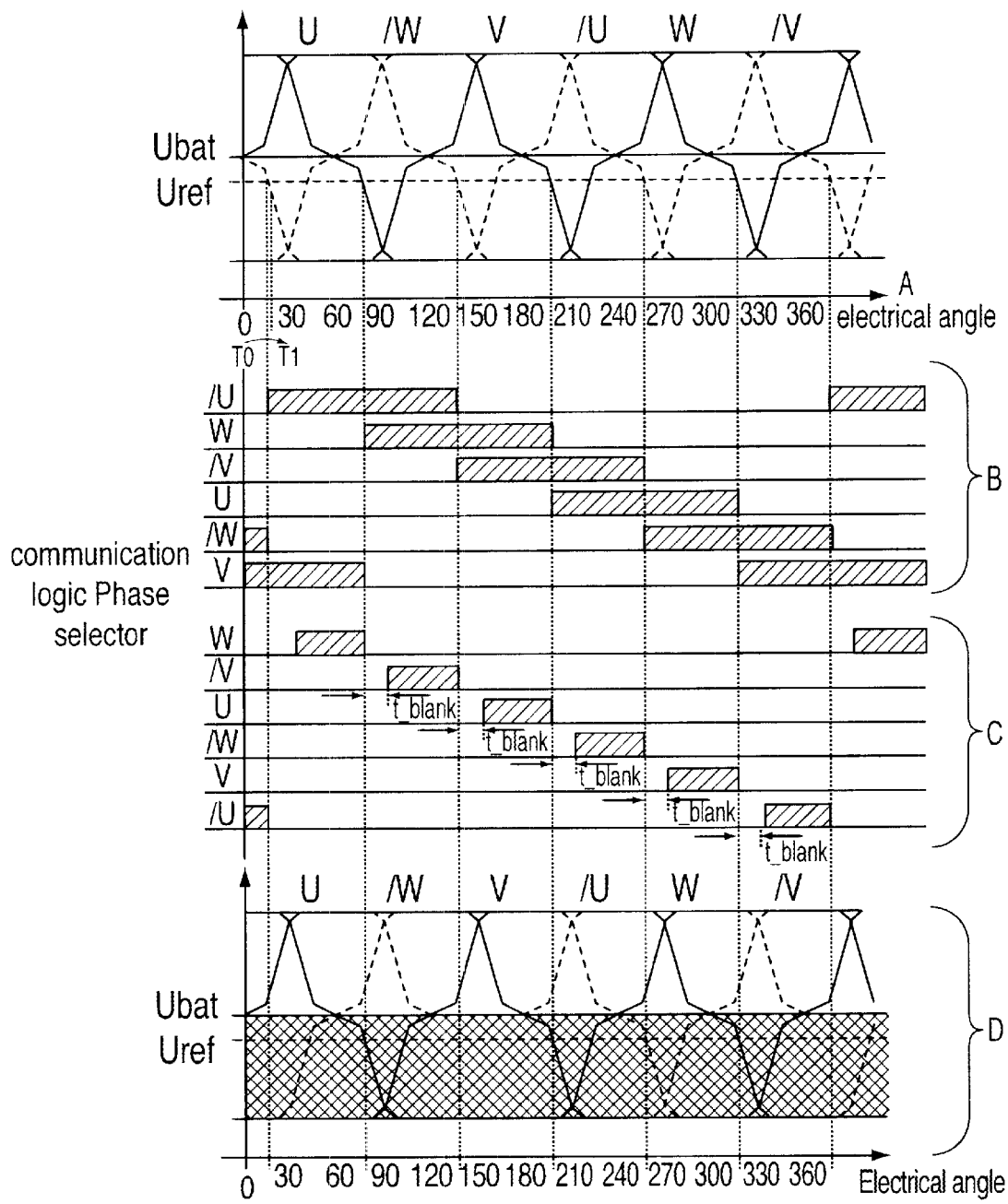
FIG. 2A shows the induced voltages that are produced by the driver device of FIG. 1 in the six winding strands of the 6-phase synchronous motor, in response to the rotation of the motor in the preferred direction, as plotted over an electrical angle of 360°.
FIG. 2B shows the current-flow angles produced in the individual winding strands for the commutation in the preferred rotation direction, as plotted over an electrical angle of 360°.
FIG. 2C shows the selector times and the blocking times of the phase selector, as plotted over an electrical angle of 360°.
FIG. 2D shows the counter-torque generated in the 6-phase motor, as plotted over an electrical angle of 360°.

Below, the function and mode of operation of the motor driver device depicted in FIG. 1 is discussed in greater detail on the basis of FIG. 2, in the example of a six-phase synchronous motor running in the preferred direction.

Rotation in the Preferred Direction

Motor 1 is composed of a total of six phases, each of which is electrically phase-shifted by 60°. To rotate the rotor furnished with permanent magnets, as is shown in FIG. 2A, the individual phases are supplied with power in sequence, following the order U=>/W=>V=>/U=>W=>/V. At time T0, phase discriminator 6 suppresses all phases except phase/U. In this way, phase selector circuit 4 transmits the induced voltage of phase/U directly to commutation detection circuit 5. At time T1, the induced voltage of phase/U, caused by the rotational motion of the rotor, undershoots the reference threshold given by reference voltage $U_{ref}$. Thereupon, commutation detection circuit 5, using its output signal 8, triggers monoflop 7, which generates an output signal 9 having fixed duration t_blank, the output signal advancing phase discriminator circuit 6 one state further. At the same time, phase selector circuit 4 is blocked for duration t_blank of monoflop pulse 9, to avoid faulty commutations. The output signals of phase discriminator circuit 6 act directly on commutation logic 3. The latter thereupon switches off phase/W and switches on phase/U. When duration t_blank of monoflop pulse 9 has expired, phase selector circuit 4 is released for phase W. Thus commutation detection circuit 5 compares the voltage induced in phase W with reference voltage $U_{ref}$. In the event that the threshold indicated by this reference voltage $U_{ref}$ is undershot, the current feed is switched over from phase V to phase W, as was indicated above. This process is repeated for an electrical full wave a total of six times at identical current-flow angles of 120° per phase (see FIG. 2B).

In FIG. 2D, the cross-hatched region illustrates the torque generation in two phases. Thus a constant torque, over the plurality of phases, acts upon the motor rotating in the preferred direction through the functioning of the driver device according to the present invention.

The diagrams depicted in FIGS. 3A–3D also present, at an electrical angle of 360°, the mode of functioning of the motor driven by the driver device according to the present invention, in the case of rotation in the reverse direction.

Rotation in the Reverse Direction

Phase discriminator circuit 6, in response to each commutation pulse, i.e., output pulse 9 of monoflop 7, advances one state further, irrespective of the phase from which commutation pulse 9 is triggered. In the case of the reverse rotation of the rotor, as is depicted in FIG. 3A, the sequence of the individual phases is reversed, i.e., U=>/V=>W=>/U=>V=>/W.

Figure 3:
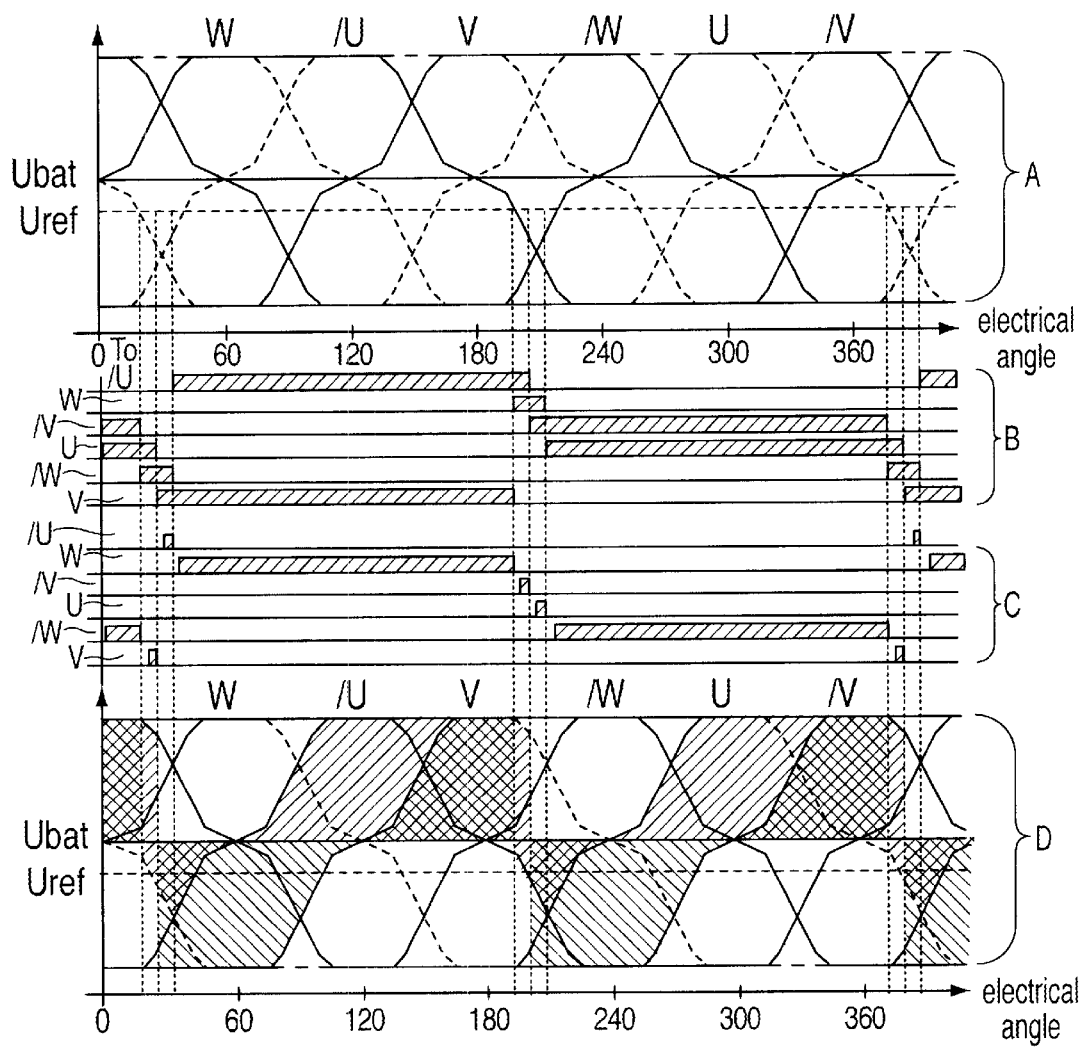
FIG. 3A shows a diagram and information like that of FIG. 2A, except that it is for a rotation of the motor in the reverse direction.
FIG. 3B shows a diagram and information like that of FIG. 2B, except that it is for a rotation of the motor in the reverse direction.
FIG. 3C shows a diagram and information like that of FIG. 2C, except that it is for a rotation of the motor in the reverse direction.
FIG. 3D shows a diagram and information like that of FIG. 2D, except that it is for a rotation of the motor in the reverse direction.

At time T0, phase/W is put through from phase selector circuit 4 to commutation detection circuit 5. If the induced voltage in phase/W undershoots the threshold indicated by reference voltage $U_{ref}$, a commutation detection pulse 8 is applied to monoflop 7, which generates output pulse 9 of duration t_blank, the output pulse being applied to phase discriminator circuit 6. The latter switches over the power supply from phase/V to phase/W. After duration t_blank expires, phase V is selected by phase selector circuit 4 for the commutation detection. At this time point, the voltage induced in phase V has already undershot the threshold indicated by $U_{ref}$, as a result of which a commutation pulse is immediately triggered. The advancing of phase discriminator circuit 6 leads to a change of the current feed from phase U to phase V. Phase selector circuit 4, after duration t_blank expires, selects phase/U for the commutation detection. Since induced voltage/U is also lower than the commutation threshold indicated by $U_{ref}$, commutation detection circuit 5 immediately detects the commutation here as well. FIG. 3 shows that within an electrical angle of 360° a total of six commutations occur, whose order is identical to the sequence when the motor is rotating in the preferred direction. The actual difference between the function depicted in FIG. 3 when motor 1 is rotating in the reverse direction as opposed to its rotation in the preferred direction, explained on the basis of FIG. 2, can be seen in the current-flow angles of the individual phases, which, as can be seen from FIG. 3B, are of varying sizes.

The direction of the resulting torque (see the cross-hatched areas in FIG. 3D) are a function of the sign of the induced voltage. In the case of a positive induced voltage, a counter-torque is generated which opposes the rotational motion in the reverse direction. The comparison of the current-flow angles with the specifically corresponding course of the induced voltages indicates that, as a result of the long current-flow angles in the case of reverse rotation, more counter-torque than torque is generated in the reverse rotation direction. This leads to a rapid braking of the motor and to a subsequent automatic startup in the preferred rotation direction.

In the exemplary method according to the present invention for driving a polyphase DC motor, phase selector circuit 4 for purposes of commutation detection selects, in each case, only one phase, which is supplied to commutation detection circuit 5. After each commutation detected by commutation detection circuit 5, as a result of pulse 9 of constant duration t_blank generated by monoflop 7, phase discriminator circuit 6 and, as a consequence, commutation logic 3 are advanced in a fixed, preestablished sequence. This occurs, irrespective of the rotation direction of motor 1, in the form of (through the agency of) the sequential logic device embodied by commutation logic 3. When motor 1 rotates in the preferred direction, constant current-flow angles of 120° are therefore achieved for each phase. When the motor rotates in the reverse direction, markedly varying current-flow angles of the individual phases are generated by this exemplary method, these varying current-flow angles, as a function of the course of the specifically corresponding voltages induced in the individual phases, resulting in a counter-torque. This counter-torque brings about a braking of the motor to a standstill and a reliable startup in the preferred direction. The electronics depicted in FIG. 1, in this context, do not distinguish between the two rotation directions. For this reason, no additional electronics expense is required to make possible a reliable startup from the reverse rotation.

The exemplary method according to the present invention and the exemplary device according to the present invention for driving a polyphase DC motor are not limited to the exemplary embodiments described above. In particular, the number of winding strands and of phases of the motor is not subject to any limitation.

What is claimed is:

1. A method for driving a motor and for braking the motor running in a reverse rotation direction and for restarting the motor in a preferred rotation direction, the motor being an electronically commutated, polyphase DC motor having winding strands that are connectable to a DC energy source in a preestablished sequence using switching elements that are drivable by an electronic commutation device, the method comprising the steps of:
   selecting one phase at each time point for each of the directions;
   detecting a commutation, wherein a voltage in the one phase is induced in a corresponding motor winding and the voltage is compared with a reference voltage; and
   advancing the one phase and another phase to be commutated by the electronic commutation device by one step in a preestablished sequence after detecting the commutation;
   wherein, when the motor is rotating in the preferred direction, a constant current-flow angle is established for each phase, and, when the motor is rotating in the reverse direction, markedly varying current-flow angles are established for each phase, which results in a counter-torque opposing the reverse rotation direction depending on a curve of a corresponding induced phase voltage.

2. The method of claim 1, wherein the preestablished sequence is the same for the reverse rotation direction and the preferred rotation direction.

3. A device for driving a motor, the motor being an electronically commutated, polyphase DC motor, the device comprising:
   a power switch arrangement connectable to the motor, the power switch arrangement being usable for supplying a pulsed DC voltage in a preestablished sequence to the individual winding strands of the motor, wherein the pulsed DC voltage is derivable from a DC voltage source;
   a commutation logic arrangement for driving the power switch arrangement based on the preestablished sequence; and
   a braking arrangement for braking the motor when it is operating in the reverse rotation direction and for causing the motor to run in the preferred rotation direction;
   wherein the braking arrangement includes:
      a phase discriminator circuit connectable to the commutation logic arrangement;
      a phase selector circuit connectable to motor windings for being acted upon by an output signal from the phase discriminator for selecting one phase for each of the directions at every time point, the one phase being the selected phase;
      a commutation detection circuit acted upon by the selected phase for detecting a commutation by comparing a voltage induced in the selected phase in a corresponding motor winding with a reference voltage and for generating a commutation detection signal; and
      the phase discriminator circuit and the commutation logic arrangement is advancable one step in the preestablished sequence by the commutation detection circuit in response to the commutation detection signal so that, when the motor rotates in the preferred direction, a constant current-flow angle is established for every phase, and when the motor rotates in the reverse direction, markedly varying current-flow angles are established for every phase that generates a counter-torque opposing the reverse rotation direction depending on the course of the corresponding voltage induced in each phase.

4. The device of claim 3, wherein the braking arrangement further includes a monoflop, the monoflop being triggerable by the commutation detection signal and generating a switching signal of a predetermined duration for advancing the phase discriminator circuit, the switching signal simultaneously blocking the phase selector circuit for the predetermined duration.

5. The device of claim 3, wherein the phase discriminator circuit and the commutation logic arrangement form a sequential logic device.

6. The device of claim 3, wherein the advance of the phase discriminator circuit and of the commutation logic arrangement occurs for the preferred rotation direction and for the reverse rotation direction.

7. The device of claim 4, wherein the motor is a six-phase synchronous motor and the preestablished commutation sequence of the power switch arrangement includes a sequence of U=>/W=>V=>/U=>W=>/V, the preestablished commutation sequence being controlled by the commutation logic arrangement.

8. The device of claim 15, wherein the predetermined duration of the switching signal of the monoflop corresponds to an electrical angle of about 15° in the motor.

* * * * *